(12) United States Patent
Draudt et al.

(10) Patent No.: US 7,455,303 B2
(45) Date of Patent: Nov. 25, 2008

(54) CHUCK WITH INTERNAL NUT

(75) Inventors: Gregg Draudt, Stowe, MA (US); Gordon Row, Groton, MA (US); Tim Proulx, Nashua, NH (US)

(73) Assignee: The Jacobs Chuck Manufacturing Company, Clemson, SC (US)

( * ) Notice: Subject to any disclaimer, the term of this patent is extended or adjusted under 35 U.S.C. 154(b) by 407 days.

(21) Appl. No.: 11/219,060

(22) Filed: Sep. 2, 2005

(65) Prior Publication Data

US 2007/0052183 A1    Mar. 8, 2007

(51) Int. Cl.
*B23B 31/163* (2006.01)
(52) U.S. Cl. .......................................... 279/63; 279/140
(58) Field of Classification Search ................... 279/60, 279/62, 63, 140
See application file for complete search history.

(56) References Cited

U.S. PATENT DOCUMENTS

| | | | |
|---|---|---|---|
| 1,188,532 A | 6/1916 | Cobey | 279/63 |
| 1,509,061 A | 9/1924 | Hardwicke | 279/60 |
| 1,985,242 A | 12/1934 | Deback | 192/56.53 |
| 2,458,824 A | 1/1949 | Axelsson | 279/64 |
| 2,684,856 A | 7/1954 | Stoner | 279/61 |
| 2,716,555 A | 8/1955 | Rowe | 279/56 |
| 3,237,955 A | 3/1966 | McCarthy et al. | 279/63 |
| 3,325,166 A | 6/1967 | McCarthy et al. | 279/63 |
| 3,506,277 A | 4/1970 | Harms | 279/63 |
| 3,545,776 A | 12/1970 | Haviland | 279/63 |
| 3,945,751 A | 3/1976 | Johnson | 408/139 |
| 4,260,169 A * | 4/1981 | Hall | 279/62 |
| 4,272,087 A | 6/1981 | Rohm | 279/62 |
| 4,277,074 A | 7/1981 | Kilberis | 279/62 |
| 4,317,578 A | 3/1982 | Welch | 279/60 |
| 4,323,324 A | 4/1982 | Eberhardt | 408/124 |
| 4,358,230 A | 11/1982 | Rohlin | 408/124 |
| 4,389,146 A | 6/1983 | Coder | 408/240 |
| 4,395,170 A | 7/1983 | Clarey | 279/62 |
| 4,460,296 A | 7/1984 | Sivertson, Jr. | 408/124 |
| 4,498,682 A | 2/1985 | Glore | 279/61 |

(Continued)

FOREIGN PATENT DOCUMENTS

DE        41 06 129 A1    9/1992

(Continued)

*Primary Examiner*—David P. Bryant
*Assistant Examiner*—Eric A Gates
(74) *Attorney, Agent, or Firm*—Nelson Mullins Riley & Scarborough, LLP

(57) ABSTRACT

A chuck for use with a manual or powered driver having a housing and a rotatable drive shaft, the chuck including a generally cylindrical body with a nose section and a tail section. The tail section has an internal cavity formed therein and the nose section has an axial bore formed therein. A nut is disposed within the internal cavity, the nut including a central bore. A spindle includes a forward portion extending into the central bore of the nut and a rear portion configured to receive the drive shaft. A plurality of jaws are movably disposed with respect to the body, each of the jaws are in communication with the axial bore and are operatively coupled to the nut, and a sleeve is disposed about the body. The nut is axially movable with respect to the spindle between a first position and a second position. The nut is rotatably fixed to the spindle in the first position and non-rotatably fixed to the spindle in the second position.

20 Claims, 7 Drawing Sheets

U.S. PATENT DOCUMENTS

| | | | | |
|---|---|---|---|---|
| 4,526,497 A | 7/1985 | Hatfield | | 408/240 |
| 4,536,113 A | 8/1985 | Hatfield | | 409/234 |
| 4,563,013 A | 1/1986 | Hunger et al. | | 279/64 |
| 4,607,855 A | 8/1986 | Rohm | | 279/62 |
| 4,621,820 A | 11/1986 | Rohm | | 279/19.3 |
| 4,627,626 A | 12/1986 | Rohm | | 279/145 |
| 4,627,627 A | 12/1986 | Rohm | | 279/19.3 |
| 4,627,628 A | 12/1986 | Rohm | | 279/20 |
| 4,655,464 A | 4/1987 | Manschitz et al. | | 279/64 |
| 4,669,932 A | 6/1987 | Hartley | | 408/239 R |
| 4,682,918 A | 7/1987 | Palm | | 408/241 R |
| 4,695,065 A * | 9/1987 | Komatsu et al. | | 279/60 |
| 4,695,066 A | 9/1987 | Rohm | | 279/62 |
| 4,700,956 A | 10/1987 | Rohm | | 279/19.4 |
| 4,703,941 A | 11/1987 | Rohm | | 279/62 |
| 4,703,942 A | 11/1987 | Rohm | | 279/19.4 |
| 4,773,657 A | 9/1988 | Rohm | | 279/19.1 |
| 4,836,563 A | 6/1989 | Rohm | | 279/63 |
| 4,840,387 A | 6/1989 | McCarthy | | 279/134 |
| 4,844,482 A | 7/1989 | Rohm | | 279/19 |
| 4,913,449 A | 4/1990 | Rohm | | 279/60 |
| 4,915,555 A | 4/1990 | Smothers | | 408/240 |
| 4,951,955 A | 8/1990 | Sakamaki | | 279/62 |
| 4,955,623 A | 9/1990 | Rohm | | 279/60 |
| 4,958,840 A | 9/1990 | Palm | | 279/62 |
| 4,968,191 A | 11/1990 | Palm | | 408/124 |
| 4,991,860 A | 2/1991 | Rohm | | 279/62 |
| 5,009,439 A | 4/1991 | Sakamaki | | 279/62 |
| 5,011,343 A | 4/1991 | Saban et al. | | 279/60 |
| 5,054,796 A | 10/1991 | Rohm | | 279/60 |
| 5,125,673 A | 6/1992 | Huff et al. | | 279/60 |
| 5,145,192 A | 9/1992 | Rohm | | 279/62 |
| 5,145,193 A | 9/1992 | Rohm | | 279/62 |
| 5,171,030 A | 12/1992 | Rohm | | 279/63 |
| 5,174,588 A | 12/1992 | Reibetanz et al. | | 279/62 |
| 5,183,274 A | 2/1993 | Sakamaki | | 279/62 |
| 5,191,968 A | 3/1993 | McCurry | | 200/43.11 |
| 5,195,760 A | 3/1993 | Wheeler et al. | | |
| 5,234,223 A | 8/1993 | Sakamaki | | 279/61 |
| 5,236,206 A | 8/1993 | Rohm | | 279/63 |
| 5,261,679 A | 11/1993 | Nakamura | | 279/62 |
| 5,286,041 A | 2/1994 | Rohm | | 279/60 |
| 5,322,303 A | 6/1994 | Nakamura | | 279/62 |
| 5,375,857 A | 12/1994 | Rohm | | 279/62 |
| 5,375,858 A | 12/1994 | Rohm | | 279/63 |
| 5,458,345 A | 10/1995 | Amyot | | |
| 5,464,230 A | 11/1995 | Rohm | | 279/63 |
| 5,503,409 A | 4/1996 | Rohm | | 279/62 |
| 5,531,549 A | 7/1996 | Fossella | | 408/240 |
| 5,624,125 A | 4/1997 | Rohm | | 279/62 |
| 5,882,153 A | 3/1999 | Mack et al. | | 408/240 |
| 5,927,914 A | 7/1999 | Mack et al. | | 408/240 |
| 5,957,469 A | 9/1999 | Miles et al. | | 279/62 |
| 5,988,653 A | 11/1999 | Kuo | | 279/62 |
| 5,992,859 A | 11/1999 | Lin | | 279/62 |
| 6,007,071 A | 12/1999 | Middleton | | 279/62 |
| 6,073,939 A | 6/2000 | Steadings et al. | | 279/62 |
| 6,179,301 B1 | 1/2001 | Steadings et al. | | 279/62 |
| 6,196,554 B1 * | 3/2001 | Gaddis et al. | | 279/63 |
| 6,241,259 B1 | 6/2001 | Gaddis et al. | | 279/63 |
| 6,247,706 B1 | 6/2001 | Kuo | | 279/62 |
| 6,257,596 B1 | 7/2001 | Yang | | 279/62 |
| 6,260,856 B1 | 7/2001 | Temple-Wilson | | 279/62 |
| 6,513,604 B2 * | 2/2003 | Hanke | | 173/48 |
| 6,729,812 B2 * | 5/2004 | Yaksich et al. | | 408/240 |
| 7,021,400 B2 * | 4/2006 | Oretti | | 173/29 |
| 7,328,904 B2 * | 2/2008 | Schell et al. | | 279/60 |
| 7,360,770 B2 * | 4/2008 | Luckenbaugh et al. | | 279/62 |
| 2004/0004329 A1 * | 1/2004 | Schroeder | | 279/60 |
| 2004/0222600 A1 * | 11/2004 | Jacobs et al. | | 279/48 |
| 2006/0061048 A1 * | 3/2006 | Puzio et al. | | 279/60 |

FOREIGN PATENT DOCUMENTS

| | | |
|---|---|---|
| DE | 196 06 795 C2 | 9/1997 |
| GB | 2 359 507 A | 8/2001 |
| WO | WO 2006/037063 A2 | 4/2006 |

* cited by examiner

CHUCK WITH INTERNAL NUT

TECHNICAL FIELD

The present disclosure relates generally to chucks for use with drills or with electric or pneumatic power drivers. More particularly, the present invention relates to a chuck of the keyless type having an internal nut.

BACKGROUND

Hand, electric, and pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws that are moveable in the passageways to grip a cylindrical or polygonal tool shank displaced along the chuck center axis. The chuck includes a nut that rotates relative to the chuck and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand.

Various configurations of keyless chucks are known in the art and are desirable for a variety of applications. In the case of a two sleeve chuck, the front sleeve is rotationally coupled to the nut and the rear sleeve is rotationally coupled to the chuck body. Thus, rotation of the front sleeve relative to the rear sleeve causes the jaws to move within the chuck body in either the opening or closing direction, depending on the direction of relative rotation. In a single sleeve design, however, rotation of the chuck body relative to the single sleeve, and therefore the nut, is generally accomplished by actuating the drill unit while an operator holds the sleeve. It is also known to provide a sleeve on the driver housing that is rotationally fixed to, but axially moveable with respect to, the housing. This sleeve is moveable into engagement with the chuck sleeve so that the sliding sleeve rotationally fixes the chuck sleeve and the nut to the driver housing. Upon activation of the driver, therefore, the driven spindle rotates the chuck body relative to the rotationally fixed sleeve and nut, thereby opening or closing the chuck depending on the spindle's rotational direction.

SUMMARY

The present disclosure recognizes and addresses considerations of prior art constructions and methods. In one embodiment of the present disclosure, a chuck for use with a manual or powered driver has a generally cylindrical body having a nose section and a tail section, the tail section having an internal cavity formed therein, and the nose section having an axial bore formed therein. A nut is disposed within the internal cavity, the nut including a central bore. A spindle including a forward portion extending into the central bore of the nut and a rear portion configured to receive the drive shaft. A plurality of jaws are movably disposed with respect to the body, each of the jaws are in communication with the axial bore and are operatively couple to the nut, and a sleeve is disposed about the body. The nut is axially movable with respect to the spindle between a first position and a second position. The nut is rotatably fixed to the spindle in the first position and non-rotatably fixed to the spindle in the second position.

The accompanying drawings, which are incorporated in and constitute a part of this specification, illustrate one or more embodiments of the chuck and, together with the description, serve to explain the principles of the chuck.

BRIEF DESCRIPTION OF THE DRAWINGS

A full and enabling disclosure of the present chuck, including the best mode thereof, directed to one of ordinary skill in the art, is set forth in the specification, which makes reference to the appended drawings, in which.

Figure 1:
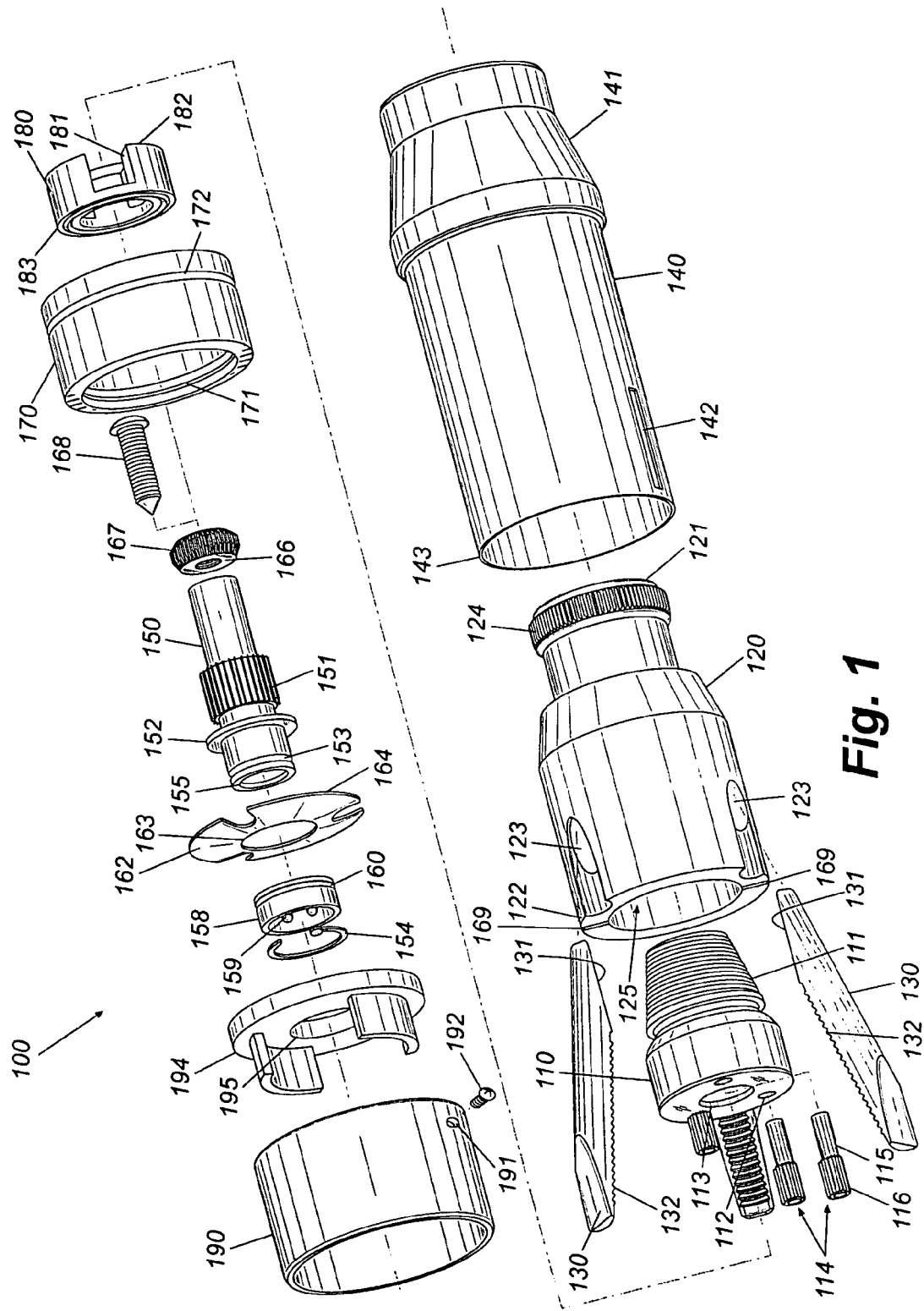
FIG. 1 is an exploded perspective view of a chuck in accordance with an embodiment of the present disclosure.

Repeat use of reference characters in the present specification and drawings is intended to represent same or analogous features or elements of the chuck.

DETAILED DESCRIPTION OF PREFERRED EMBODIMENTS

Reference will now be made in detail to presently preferred embodiments of the disclosure, one or more examples of which are illustrated in the accompanying drawings. Each example is provided by way of explanation, not limitation, of the chuck. In fact, it will be apparent to those skilled in the art that modifications and variations can be made in the present chuck without departing from the scope and spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Figure 2:
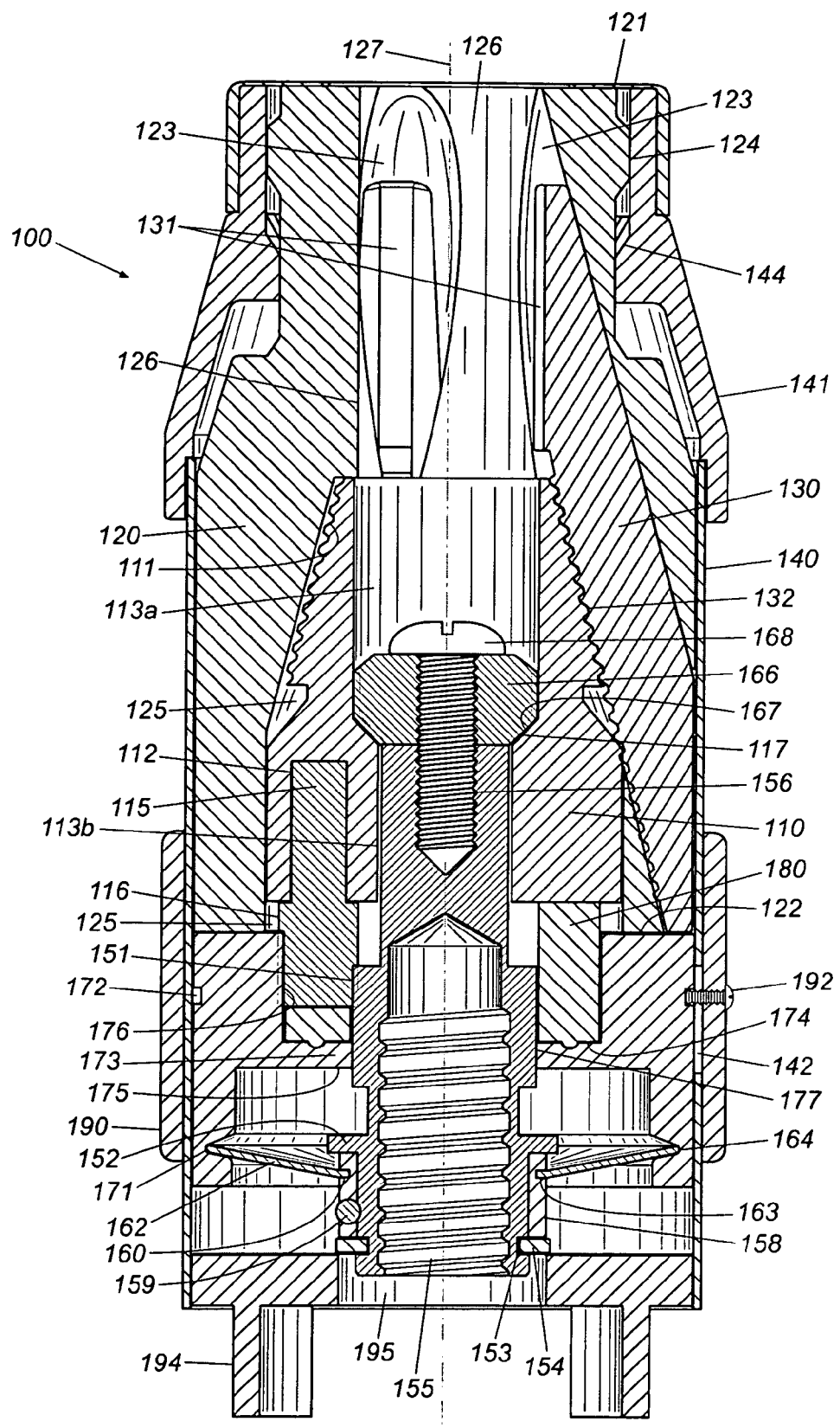
FIG. 2 is a cross-sectional view of the assembled chuck as shown in FIG. 1.

Referring to FIGS. 1 and 2, a chuck 100 includes an internal nut 110, a body 120, a plurality of jaws 130, an outer sleeve 140, a spindle 150, and a ground plate 170. Body 120 is generally cylindrical in shape and comprises a nose or forward section 121 and tail or rearward section 122. Nose section 121 has a front face transverse to the longitudinal center axis 127 of body 120 and a set of locking splines 124 formed circumferentially about nose section 121. Nose section 121 defines an axial bore 126 that is dimensioned somewhat larger than the largest tool shank that chuck 100 is designed to accommodate. An internal cavity 125 is formed in tail section 122 and is sized to receive nut 110. Internal cavity 125 and axial bore 126 communicate at a central region of body 120.

Body 120 defines three passageways 123 to accommodate the three jaws. Each jaw 130 is separated from the adjacent jaws by an arc of approximately 120°. The axes of passageways 123 and jaws 130 are angled with respect to longitudinal center axis 127 such that each passageway axis travels through axial bore 126 and intersects longitudinal center axis 127 at a common point ahead of the chuck body. The jaws form a grip that moves radially toward and away from the chuck axis to grip a tool, each jaw 130 having a tool engaging face 131 generally parallel to center axis 127 of chuck 100. Threads 132, formed on the opposite or outer surface of each jaw, may be constructed in any suitable type and pitch. It should be understood that the present disclosure encompasses embodiments having fewer than, or more than, three jaws 130.

Nut 110 includes a frustoconical forward portion and a substantially cylindrical rear portion. The forward portion of nut 110 has threads 111 configured to mate with jaw threads 132. Nut 110 is received within internal cavity 125 of body 120 such that nut threads 111 engage the jaw threads. Rotation of nut 110 with respect to body 120 causes jaws 130 to be advanced or retracted within passageways 123, depending on the nut's rotational direction.

The rear portion of nut 110 includes a plurality of gear bores 112 configured to rotationally receive a plurality of planetary gears 114. Each planetary gear 114 includes a gear axle 115 rotationally received within a respective gear bore 112. A set of drive splines 116 is formed circumferentially about a portion of each planetary gear 114 depending outwardly from the rear portion of nut 110.

A central bore 113 extending from the forward portion to the rear portion of nut 110 includes a forward portion 113a, a rear portion 113b, and a set of drive splines 117 formed on a frustoconical surface at the intersection of the forward and rear portions. Forward portion 113a of central bore 113 has a slightly greater diameter than does rear portion 113b. The diameter of forward portion 113a is, in one preferred embodiment, substantially similar to the diameter of axial bore 126 formed in body 120 such that forward portion 113a can accommodate tool shanks that are slidably positioned in axial bore 126. The rear portion of central bore 113 is dimensioned to slidably receive a portion of spindle 150 such that spindle 150 is rotable relative to nut 110, when desired.

Ground plate 170 is rotationally fixed to tail section 122 of body 120 by dogs extending axially forward from the ground plate and received by corresponding slots 169 but may be alternatively fixed to the tail section by press fitting or other suitable connection means. Ground plate 170 includes an inner annular groove 171, an outer annular groove 172, and an inwardly depending ledge 173 that forms an annular seat 174 and a central aperture 177. Central aperture 177 is dimensioned to allow the passage of spindle 150 therethrough, and annular seat 174 is configured to rotationally receive a drive ring 180 therein. The inner circumference of annular seat 174 further comprises a planetary rack 176 for engaging drive splines 116 of planetary gears 114.

A substantially cylindrical drive ring 180 is received in annular seat 174 of ground plate 170 so that the drive ring is rotatable within the ground plate. Drive ring 180 includes a plurality of gear recesses 181, each gear recess 181 being configured to receive the end of each planetary gear 114 having drive splines 116 so that the planetary gear is rotatable in its gear recess. Each gear recess 181 is configured such that, with the drive ring positioned in annular seat 174, the drive splines of each planetary gear 114 engage both planetary rack 176 of ground plate 170 and a sun gear 151 centrally disposed on spindle 150.

Spindle 150 is substantially cylindrical and includes an outwardly depending radial ledge 152 axially rearward of sun gear 151 and an annular groove 153 axially rearward of the radial ledge. The rear portion of spindle 150 rotatably receives a bearing sleeve 158 that includes a plurality of bearing elements 159 extending through the sleeve wall into an axial bore defined by the sleeve and defines an annular groove 160 about its forward outer circumference. Bearing sleeve 158 is positioned on spindle 150 adjacent radial ledge 152 and is secured to spindle 150 by a C-clip 154 positioned in annular groove 153. A threaded bore 155 is formed in the rear portion of spindle 150 and is of a standard size to mate with the drive shaft of a powered or hand driver (not shown). While a threaded bore 155 is illustrated, such bore could be replaced with a tapered bore of a standard size to mate with a tapered drive shaft, or spindle 150 may be made as an integral piece with the driver drive shaft.

The forward portion of spindle 150 is positioned in rear portion 113b of central bore 113 formed in nut 110 and is secured in central bore 113 by a pilot bushing 166 that is, in turn, secured to the forward portion of spindle 150 by a threaded fastener 168 that engages a threaded bore 156 formed in the forward portion of spindle 150. Pilot bushing 166 includes a set of drive splines 167 that can be caused to selectively engage or disengage drive splines 117 formed on nut 110.

A plate spring 162 forwardly biases ground plate 170 relative to spindle 150. Plate spring 162 includes an inner annular edge 163 received in annular groove 160 of bearing sleeve 158 and an outer annular edge 164 received in annular groove 171 of ground plate 170.

A base plate 194 receives outer sleeve 140 in a press fit fashion. Outer sleeve 140 can also retained by use of a key, by crimping, staking, threading, or any other suitable method of securing the sleeve to the base plate so that the sleeve and base plate are rotationally coupled to each other. Outer sleeve 140 includes a nose portion 141, a base portion 143, and an axial slot 142 formed in the base portion. A set of locking splines 144 is formed about the inner circumference of nose portion 141 for selectively engaging and disengaging locking splines 124 of body 120. A control sleeve 190 is disposed about the base portion of outer sleeve 140 and secured thereto with a threaded screw 192. Screw 192 threads through an aperture 191 formed in the control sleeve and then passes through axial slot 142 of outer sleeve 140 into outer annular groove 172 of ground plate 170. Because the width of axial slot 142 is approximately that of screw 192, control sleeve 190 is limited to axial movement relative to outer sleeve 140. The engagement between screw 192 and annular groove 172, however, allows ground plate 170 to rotate relative to outer sleeve 140. Base plate 194 is rotationally secured to the housing of the powered or hand driver (not shown) and includes a central aperture 195 such that the drive shaft of the driver can engage threaded bore 155 of spindle 150.

Figure 3:
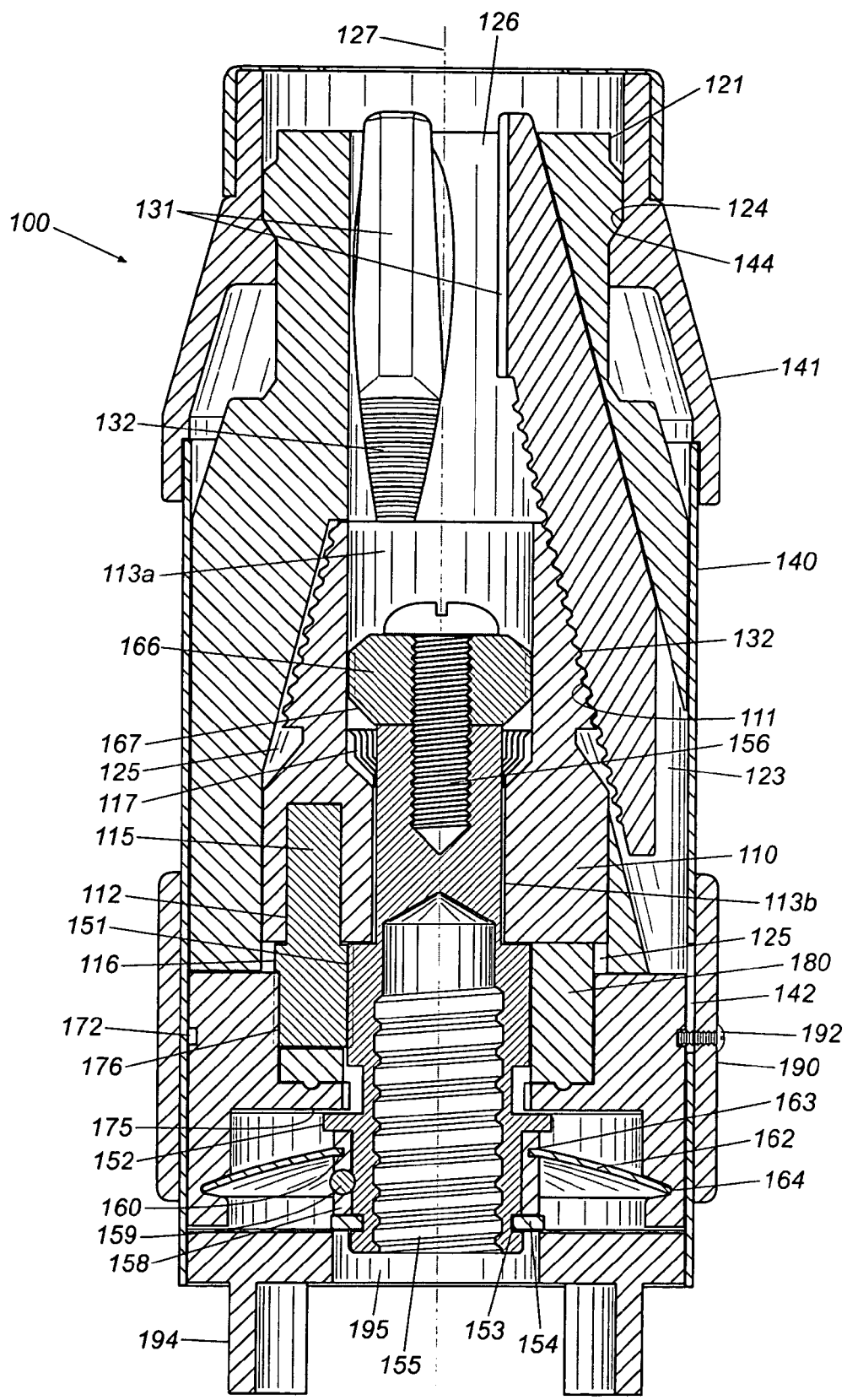
FIG. 3 is a cross-sectional view of the assembled chuck as shown in FIG. 1.

During normal operation of chuck 100, and referring now to FIGS. 2 and 3, plate spring 162 is in an at-rest position as shown in FIG. 2 such that ground plate 170, and therefore body 120, are urged forward relative to spindle 150. As discussed in greater detail below, spindle 150 and body 120 rotate together in this condition. Thus, if the jaws are gripping a tool shank, the chuck rotates the tool shank at the same rotational speed as the driver drive shaft.

To load a tool shank (not shown) into chuck 100 prior to normal operation, a user first pulls control sleeve 190 and the associated screw 192 toward base plate 194 as shown in FIG. 3. As control sleeve 190 is moved rearwardly, screw 192 exerts rearward force on outer annular groove 172. Ground plate 170 therefore moves toward base plate 194, and screw 192 simultaneously travels rearwardly in axial slot 142 of outer sleeve 140. Because body 120 and ground plate 170 are axially secured to each other, body 120 also moves rearwardly toward base plate 194. Rearward motion of body 120 continues until locking splines 124 on the nose section of body 120 engage locking splines 144 formed on nose portion 141 of outer sleeve 140. Interaction of locking splines 124 and 144 prevents rotation of body 120 and ground plate 170 relative to outer sleeve 140. As noted above, outer sleeve 140 is non-rotationally secured to the driver housing by base plate 194.

As body 120 moves rearwardly, it pushes nut 110 rearward due to the body's abutment against the front surface of the nut, such that drive splines 117 of nut 110 are disengaged from drive splines 167 of pilot bushing 166. Once drive splines 117 and 167 are disengaged, nut 110 is free to rotate about spindle 150 relative to body 120 so as to move either toward or away from central longitudinal axis 127, depending on the direction of rotation of nut 110.

Prior to insertion of a tool shank into axial bore 126, jaws 130 are retracted such that they do not prevent the tool shank's insertion into the axial bore. In FIG. 2, for example, jaws 130 are fully retracted within passageways 123. Once jaws 130 are adequately retracted, the user inserts the tool shank into axial bore 126, pulls control sleeve 190 to the rearward position shown in FIG. 3, and activities the driver so that spindle 150 rotates. Typically, rotation of spindle 150 in a clockwise direction, when viewed from the rear of the chuck, causes jaws 130 to move inwardly toward longitudinal center axis 127 and into engagement with the tool shank.

More specifically, rotation of spindle 150 causes sun gear 151 to rotate planetary gears 114 about their respective longitudinal axes through the sun gear's engagement with drive splines 116. Since drive splines 116 also engage plantetary rack 176 on the rotationally-stationary outer sleeve 140, the rotation of planetary gears 114 about their respective axes causes gears 114 to walk along the planetary gear rack, thereby imparting rotational motion to nut 110 and drive ring 180 about chuck axis 127. Because the jaws are prevented from rotating about axis 127 by the jaw passageways in the body, which is rotationally fixed to the driver housing by splines 124 and 144, relative movement between the nut threads and the jaws threads moves the jaws in the passageways. Clockwise rotation of spindle 150, for example, causes clockwise rotation of nut 110, and the resulting relative motion between moving threads 111 on nut 110 and stationary threads 132 on each jaw 130 urges jaws 130 radially inwardly towards longitudinal center axis 127 until tool engaging faces 131 abut the tool shank, thereby securing the tool shank in the desired position. With the tool shank secured, the user releases control sleeve 190, thereby allowing plate spring 162 to return to the at-rest position shown in FIG. 2.

As plate spring 162 returns to the at-rest position, the spring exerts force on ground plate 170 such that ground plate 170 and body 120 move forward relative to spindle 50. This disengages locking splines 124 on nose section 121 from locking splines 144 on nose portion 141 such that body 120 can be rotated relative to outer sleeve 140. Forward motion of ground plate 170 similarly moves nut 110 forward relative to spindle 150 until the nut's drive splines 117 fully engage with drive splines 167 of pilot bushing 166, as shown in FIG. 2. Planetary gear drive splines 116 remain engaged with both sun gear 151 and the ground plate's planetary rack 176.

Rotation of the tool secured in chuck 100 is accomplished by rotation of spindle 150 with the driver. Since nut 110 is rotationally secured to spindle 150 through engagement of drive splines 117 and 167, rotation of spindle 150 rotationally drives nut 110. Nut 110 in turn carries planetary gears 114 so that they rotate about the chuck's longitudinal center axis 127. Because spindle 150 and nut 110 rotate together, planetary gears 114 are carried along with the spindle's rotation. That is, sun gear 151 does not rotate relative to the planetary gears, and planetary gears 114 therefore do not rotate relative to their longitudinal axes.

As noted, the drive splines of each planetary gear 114 engage both sun gear 151 of spindle 150 and planetary rack 176 of ground plate 170. Since planetary gears 114 are not permitted to rotate about their respective longitudinal axis, the rotational force transferred by both nut 110 and spindle 150 by way of sun gear 151 is transferred to ground plate 170 by planetary gears 114. Ground plate 170 therefore rotates at the same rate as spindle 150, as does rigidly connected body 120. Rotation of body 120 causes rotation of the plurality of jaws 130 and, therefore, the tool secured therein.

To remove the tool from chuck 100, the user once again pulls control sleeve 190 rearwardly toward base plate 194 until locking splines 124 on body 120 engage locking splines 144 on nose portion 141 of outer sleeve 140. Jaws 130 are retracted into passageways 123 by rotation of spindle 150 in the opposite direction to that previously discussed, which is in the present case counterclockwise when viewed from behind the chuck. Because the functioning of the chuck is the same as that already discussed, except in reverse order, a detailed discussion of the retraction of jaws 130 is omitted.

Figure 4:
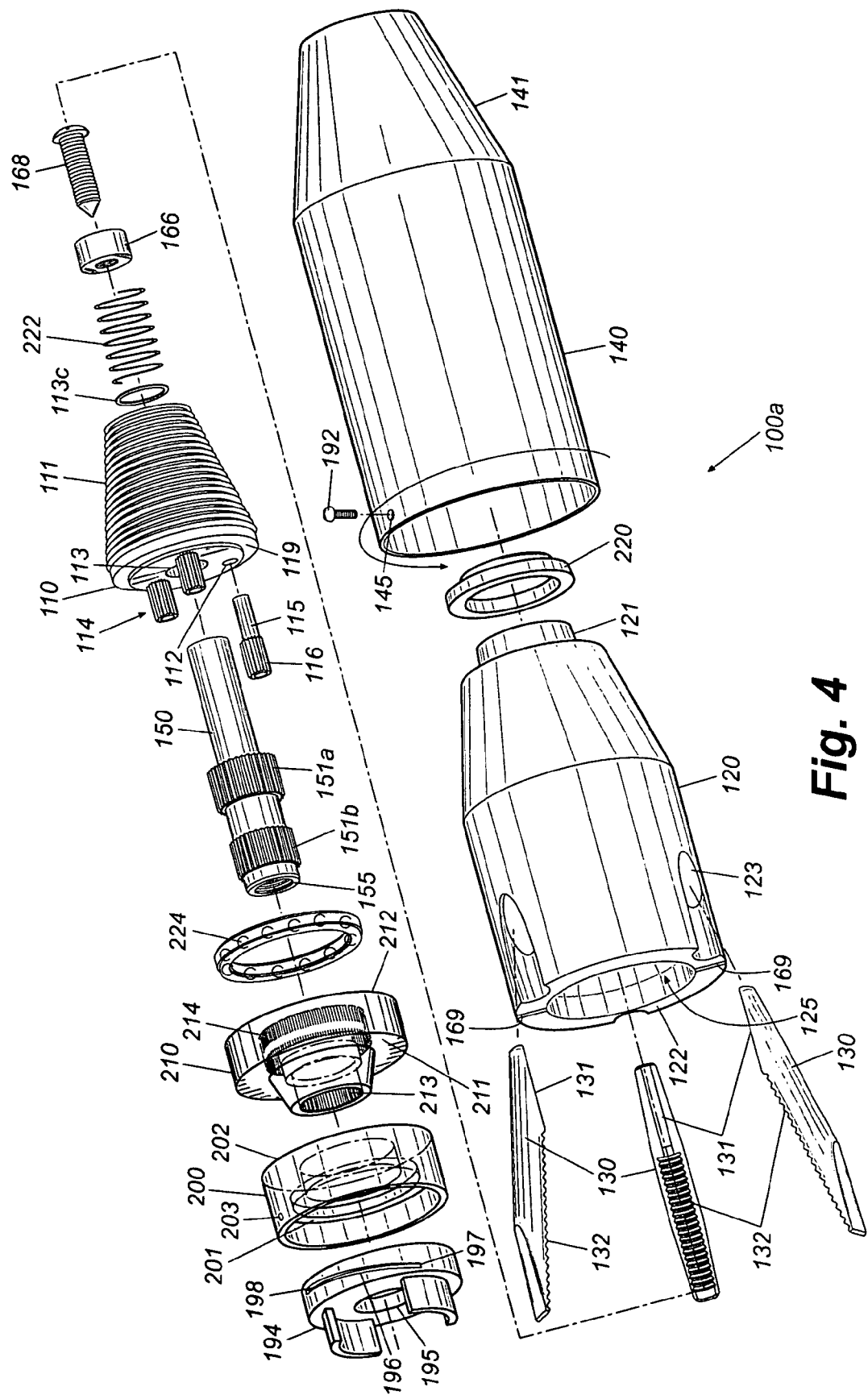
FIG. 4 is an exploded perspective view of a chuck in accordance with an embodiment of the present disclosure.
Figure 5:
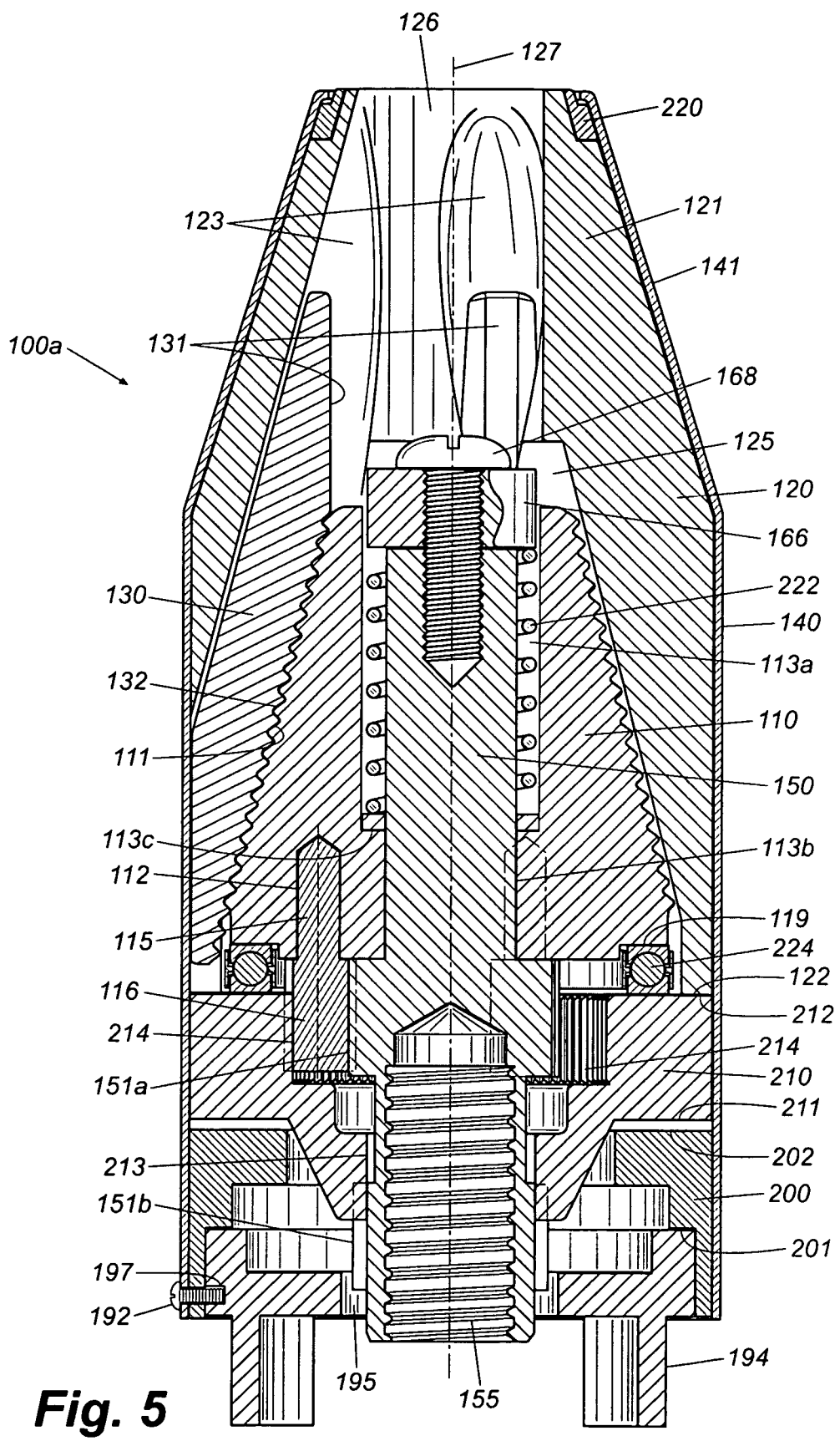
FIG. 5 is a cross-sectional view of the assembled chuck as shown in FIG. 4.

Referring now to FIGS. 4 and 5, an alternate embodiment of a chuck, 100a, includes an internal nut 110, a body 120, a plurality of jaws 130, an outer sleeve 140, a spindle 150, a pressure plate 200, and a clutch plate 210. Body 120 is generally cylindrical in shape and comprises a nose or forward section 121 and a tail or rearward section 122. Nose section 121 has a front face transverse to the longitudinal center axis 127 of body 120 and a nose bushing 220 disposed between nose section 121 and outer sleeve 140. Nose section 121 defines an axial bore 126 that is dimensioned somewhat larger than the largest tool shank that chuck 100a is designed to accommodate. An internal cavity 125 is formed in tail section 122 and is sized to receive nut 110. Internal cavity 125 and axial bore 126 communicate at a central region of body 120.

Body 120 defines three passage ways 123 to accommodate the three jaws. Each jaw 130 is separated from the adjacent jaws by an arc of approximately 120°. The axes of passageways 123 and jaws 130 are angled with respect to longitudinal center axis 127 such that each passageway axis travels through axial bore 126 and intersects longitudinal center axis 127 at a common point ahead of the chuck body. The jaws form a grip that moves radially toward and away from the chuck axis to grip a tool, each jaw 130 having a tool engaging face 131 generally parallel to longitudinal center axis 127 of chuck 100a.Threads 132, formed on the opposite or outer surface of each jaw, may be constructed in any suitable type and pitch. It should be understood that the present disclosure encompasses embodiments having fewer than, or more than, three jaws 130.

Nut 110 is substantially frustoconical in shape. The frustoconical outer surface of nut 110 defines threads 111 configured to mate with jaw threads 132. Nut 110 is received within internal cavity 125 of body 120 such that nut threads 111 engage the jaw threads. Rotation of nut 110 with respect to body 120 causes jaws 130 to be advanced or retracted within passageways 123, depending on the nut's rotational direction. The rear portion of nut 110 includes a plurality of gear bores 112 configured to receive a plurality of planetary gears 114 so that the planetary gears are rotatable in their respective gear bores. Each planetary gear 114 includes a gear axle 115 rotationally received within a respective gear bore 112. A set of drive splines 116 is formed circumferentially about a portion of each planetary gear 114, that portion depending outwardly from the rear portion of nut 110.

A central bore 113 extending from the forward portion to the rear portion of nut 110 defines a forward portion 113a, a rear portion 113b, and a ledge 113c formed therebetween, ledge 113c being transverse to longitudinal center axis 127. Forward portion 113a of central bore 113 has a slightly greater diameter than the rear portion 113b. The diameter of forward portion 113a is, in one preferred embodiment, substantially similar to the diameter of axial bore 126 formed in body 120 such that forward portion 113a can accommodate tool shanks that are slidably positioned in the axial bore. This, however, is dependent upon the length of a portion of spindle 150 that extends into nut 110, as shown in FIG. 5. The rear portion of central bore 113 is dimensioned to slidably receive a portion of spindle 150 such that spindle 150 is rotable relative to nut 110, when desired.

A clutch plate 210 is rotationally fixed to tail section 122 of body 120 by dogs extending axially forward from the ground plate and received by corresponding slots 169 in the body tail section but may be alternatively fixed to the tail section by press fitting or other suitable connections means. Clutch plate 210 defines a clutch face 211, a thrust face 212, drive splines 213, and a planetary rack 214. Drive splines 213 are formed circumferentially about a central aperture that is dimensioned to allow the passage of spindle 150 therethrough. Planetary rack 214 is formed circumferentially about an inner surface of clutch plate 210 and is configured to engage the drive splines of each planetary gear 114. A bearing assembly 224 is disposed between thrust face 212 of clutch plate 210 and a bearing surface 119 formed on the rear portion of nut 110. Bearing assembly 224 may comprise any suitable construction, such as, but not limited to, a pair of races and ball bearings disposed therebetween, a bearing cage containing a plurality of ball bearings, etc.

Spindle 150 is substantially cylindrical and includes a centrally disposed forward sun gear 151a and a rear sun gear 151b disposed between the rear end of spindle 150 and forward sun gear 151a. A threaded bore 155 is formed in the rear portion of spindle 150 and is of a standard size to mate with the drive shaft of a powered or hand driver (not shown). While a threaded bore 155 is illustrated, such bore could be replaced with a tapered bore of a standard size to mate with a tapered drive shaft, or spindle 150 may be made as an integral piece with the driver drive shaft.

The portion of spindle 150 forward of forward sun gear 151a is received in central bore 113 of nut 110 and is secured in the central bore by a pilot bushing 166 that is in turn secured to the forward portion of spindle 150. Preferably, pilot bushing 166 is secured to spindle 150 by a threaded screw 168, or other fasteners, that engages a threaded bore 156 formed in the spindle's forward portion. Pilot bushing 166 has a diameter that is slightly greater than that of forward portion of the spindle 150 so that pilot bushing 166 extends radially outwardly beyond spindle 150.

A coil spring 222 is disposed about the forward portion of spindle 150 within forward portion 113a of the central bore. At its opposing ends, coil spring 222 abuts pilot bushing 166 and a washer that sits against transverse ledge 113c. Coil spring 222 exerts rearward force on nut 110 and thereby resists forward motion of nut 110 relative to spindle 150. As best seen in FIG. 5, when coil spring 222 is in the fully extended, at-rest position, drive splines 213 of clutch plate 210 engage rear sun gear 151b of spindle 150 such that clutch plate 210 is rotationally fixed to spindle 150. Drive splines 116 of each planetary gear 114 engage both forward sun gear 151a and planetary rack 214 of clutch plate 210 at all times.

Pressure plate 200 is rotationally secured to the rear portion of outer sleeve 140 by a threaded screw 192 or other suitable member that extends through apertures 145 and 203 respectively formed in outer sleeve 140 and pressure plate 200, thereby securing pressure plate 200 to outer sleeve 140. Pressure plate 200 can also be secured to outer sleeve 140 by a press fit or use of a key, or by crimping, staking, riveting, threading or other suitable method. Pressure plate 200 includes a rear seat 201 that abuts base plate 194 and a clutch face 202 that selectively engages and disengages clutch face 211 on clutch plate 210.

Base plate 194 receives outer sleeve 140 and pressure plate 200 such that the outer sleeve and pressure plate can be rotated and moved axially with respect to the base plate. More specifically, base plate 194 includes about its outer circumference a semi-helical camming slot 196 having a first end 197 and a second end 198. Outer sleeve 140, and therefore pressure plate 200, is secured to base plate 194 by the extension of screw 192 into camming slot 196. Slot 196 is, however, sufficiently wide to allow screw 192 to travel along the slot, and the slot's semi-helical shape therefore defines the rotational and axial movement of outer sleeve 140 and pressure plate 200 that is permitted relative to base plate 194. Base plate 194 is rotationally secured to the housing of the powered or hand driver (not shown) and includes a central aperture 195 such that the drive shaft of the driver can engage threaded bore 155 of spindle 150.

Figure 6:
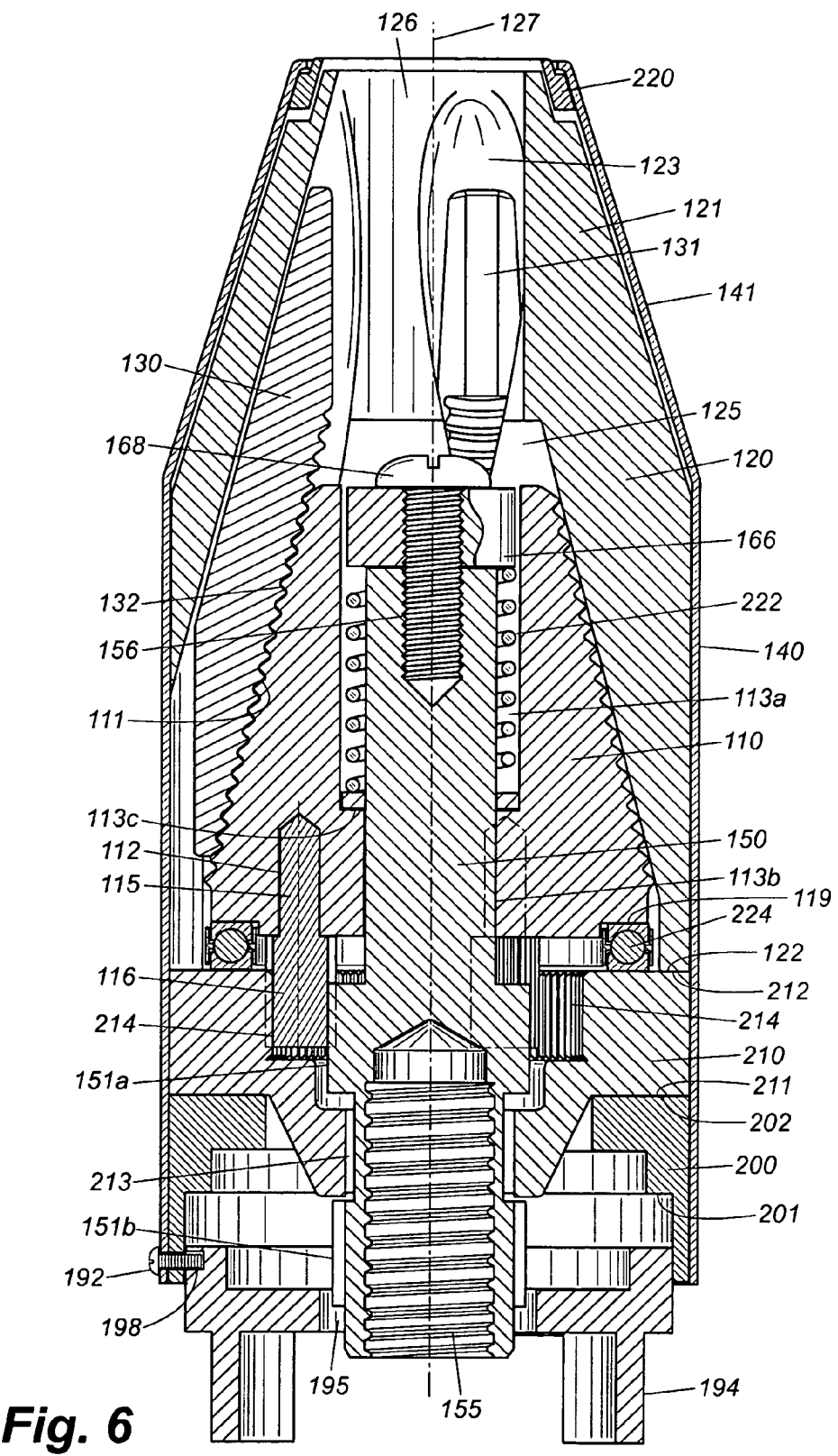
FIG. 6 is a cross-sectional view of the assembled chuck as shown in FIG. 4.

During normal operation of chuck 100a, and referring now to FIGS. 5 and 6, coil spring 222 is in the at-rest position as shown in FIG. 5 such that nut 110 and clutch plate 210 are urged rearwardly relatively to spindle 150. As discussed in greater detail below, spindle 150 and body 120 rotate together in this condition. Thus, if the jaws are gripping a tool shank, the chuck rotates the tool shank at the same rotational speed as the driver drive shaft.

To load a tool shank (not shown) into chuck 100a prior to normal operation, a user first rotates outer sleeve 140 from its normal operating position (FIG. 5) to the tool loading position as shown in FIG. 6. Outer sleeve 140 is rotated in a counter clockwise direction relative to base plate 194, when viewed from the rear. As outer sleeve 140 is rotated, screw 192 is urged along camming slot 196 from first end 197 (FIG. 5) to second end 198 (FIG. 6). Pressure plate 200 therefore moves forward relative to spindle 150 an axial distance equal to that which screw 192 moves axially along camming slot 196. As pressure plate 200 is moved axially with respect to longitudinal center axis 127, clutch face 202 of pressure plate 200 eventually abuts clutch face 211 of clutch plate 210. Further axial movement of pressure plate 200 urges clutch plate 210 forward relative to spindle 150 (against the rearward force exerted on pressure plate 200 by coil spring 222 by way of nut 110) until drive splines 213 of clutch plate 210 fully disengage from rear sun gear 151b of spindle 150 (FIG. 6). So configured, spindle 150 is now free to rotate without inducing clutch plate 210 to rotate.

In this condition, clutch plate 210 is non-rotationally held in position relative to base plate 194 by the force exerted between clutch plate 210 and pressure plate 200. Pressure plate 200 is non-rotationally secured relative to base plate 194 by the user's grip, and this non-rotational force is transferred to clutch plate 210 through interaction of clutch faces 202 and 211. Clutch faces 202 and 211 can include opposed toothed surfaces, frictional materials, or any combination of surfaces that creates adequate friction such that force can be exerted on clutch plate 210 by pressure plate 200, thereby preventing rotation of clutch plate 210.

Prior to attempting insertion of a tool shank into axial bore of 126, jaws 130 are retracted such that that they do not interfere with the tool shank's insertion into the axial bore. In FIG. 5, for example, jaws 130 are fully retracted within passageways 123. Assuming jaws 130 are adequately retracted, the user inserts the tool shank into axial bore 126 and with outer sleeve 140 rotated to the tool loading position shown in FIG. 6, activates the driver so that spindle 150 rotates. Typically, rotation of spindle 150 in a clockwise direction (when viewed from the rear of the chuck) causes jaws 130 to move inwardly toward longitudinal center axis 127 and into engagement with the tool shank.

More specifically, rotation of spindle 150 causes sun gear 151a to rotate planetary gears 114 about their respective longitudinal axes through the sun gear's engagement with drive splines 116. Since drive splines 116 also engage planetary rack 214 on the rotationally-stationary clutch plate 210, the rotation of planetary gears 114 about their respective axes causes gears 114 to walk along the planetary gear rack, thereby imparting rotational motion to nut 110 about chuck axis 127.

Because the jawas are prevented from rotating about axis 127 by the jaw passageways in the body, which is rotationally fixed by the user's grip through the engagement of the dogs in the front face of clutch plate 210 with slots 169, relative movement between the nut threads and the jaw threads moves the jaws in the jaw passageways. Clockwise rotation of spindle 150, for example, causes clockwise rotation of nut 110, and the resulting motion between moving threads 111 on nut 110 and stationary threads 132 on each jaw 130 urges the jaw radially inwardly toward longitudinal center axis 127 until tool engaging faces 131 abut the tool shank, thereby securing the tool shank in the desired position. With the tool shank secured, the user rotates outer sleeve 140 clockwise, as viewed from the rear, such that screw 192 is returned to first end 197 of camming slot 196. Outer sleeve 140 and pressure plate 200 carry body 120 axially rearward as screw 192 carries sleeve 140 rearward by its travel in slot 196. Nut 110 and clutch plate 210, being disposed between the body and the clutch plate, also move rearward, thereby allowing coil spring 222 to return to the at-rest position shown in FIG. 5.

Rearward motion of clutch plate 210 relative to spindle 150 causes drive splines 213 of clutch plate 210 to engage rear sun gear 151b of spindle 150. Clutch plate 210 is therefore rotationally fixed to spindle 150 (FIG. 5), and each planetary gear 114 is therefore non-rationally secured about its own longitudinal axis between forward sun gear 151a and planetary rack 214 of clutch plate 210.

Rotation of the tool secured in chuck 100a is accomplished by rotation of spindle 150 with the driver. Since the engagement of drive splines 213 and rear sun gear 151b rotationally secures clutch plate 210 to spindle 150, rotation of spindle 150 causes sun gear 151a and the clutch plate to carry planetary gears 114 about longitudinal center axis 127 of chuck 110 with rotation of the planetary gears about their respective longitudinal axes. This rotational movement of planetary gears 114 about longitudinal center axis 127 rotates nut 110 about the chuck's center axis at the same rate as clutch plate 210. Because body 120 is rotationally fixed to clutch plate 210, the body rotates about longitudinal center axis 127 at the same rate as does spindle 150 and nut 110. Therefore, there is no relative motion between the nut and the body, and the plurality of jaws 130 maintains a secure grip on the tool shank as the jaws are rotated about the longitudinal center axis.

To remove the tool from chuck 100a, the user once again rotates outer sleeve 140 counterclockwise, when viewed from the chuck's rear, until pressure plate 200 induces enough forward motion to clutch plate 210 to disengage drive splines 213 from rear sun gear 151b. Jaws 130 are their retracted into passageways 123 by rotation of spindle 150 in the opposite direction to that previously discussed, which is in the present case counterclockwise when viewed from behind the chuck. Because the functioning of the chuck from this point on is the same as that previously discussed, except in reverse order, a detailed discussion of the retraction of jaws 130 is omitted.

Figure 7:
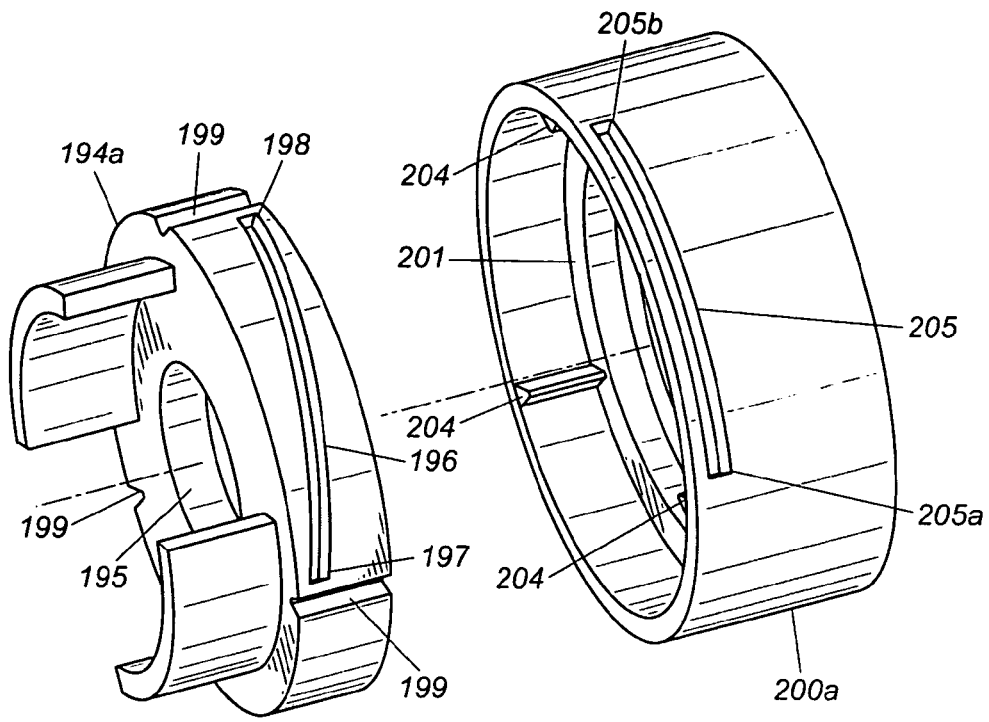
FIG. 7 is a perspective view of an alternate base plate and pressure plate for use with a chuck as shown in FIG. 4.

FIG. 7 illustrates alternate embodiments of a base plate 194a and a pressure plate 200a for use with the chuck shown in FIGS. 4-6. Base plate 194a includes a central aperture 195, a camming slot 196, and one or more longitudinal grooves 199. As with the embodiment shown in FIGS. 4-6, camming slot 196 receives screw 192, the interaction of which limits the rotational and axial movement of outer sleeve 140 relative to base plate 194a.

Pressure plate 200a includes one or more longitudinal splines 204 and a transverse slot 205 that lies in a plane that is transverse to longitudinal center axis 127. Longitudinal splines 204 are slideably received by longitudinal grooves 199 of base plate 194a, thereby non-rotationally positioning pressure plate 200a relative to base plate 194a while permitting relative axial movement between the two parts. Screw 192 extends through aperture 145 of outer sleeve 140 and transverse slot 205 and into camming slot 196 such that outer sleeve 140 can move rotationally relative to base plate 194a and pressure plate 200a but is axially fixed to pressure plate 200a.

In the normal operating position, screw 192 is positioned adjacent a first end 205a of transverse slot 205 and a first end of 197 of camming slot 196 such that pressure plate 200a is disengaged from clutch plate 210 (FIG. 5). To load a tool shank (not shown) prior to operation, a user rotates outer sleeve 140 counterclockwise (when viewed from the rear of the clutch) relative to base plate 194a, so that camming slot 196 urges screw 192 forward relative to spindle 150. As screw 192 moves forward, the screw also urges pressure plate 200a forward relative to spindle 150 through the forward edge of transverse slot 205. Pressure plate 200a eventually engages clutch plate 210, and subsequent forward motion of pressure plate 200a causes drive splines 213 of clutch plate of 210 to disengage rear sun gear 151b. Operation of the chuck from this point on is the same as that described above with respect to FIG. 6 and is therefore not further provided here.

After the desired tool has been secured in the chuck, the user returns the chuck to the normal operating position by rotating outer sleeve 140 clockwise (when viewed from the rear of the chuck) relative to base plate 194a. As screw 192 travels along camming slot 196 from second end 198 to first end 197, it simultaneously exerts rearward force on the rear edge of the transverse slot 205 as it moves from a second end 205b to a first end 205a of transverse slot 205. Rearward motion of pressure plate 200a eventually allows drive splines 213 of clutch plate 210 to engage rear sun gear 151b of spindle 150. The chuck is now configured for normal operations, as previously discussed with regard to the embodiment as shown in FIG. 5.

Figure 8:
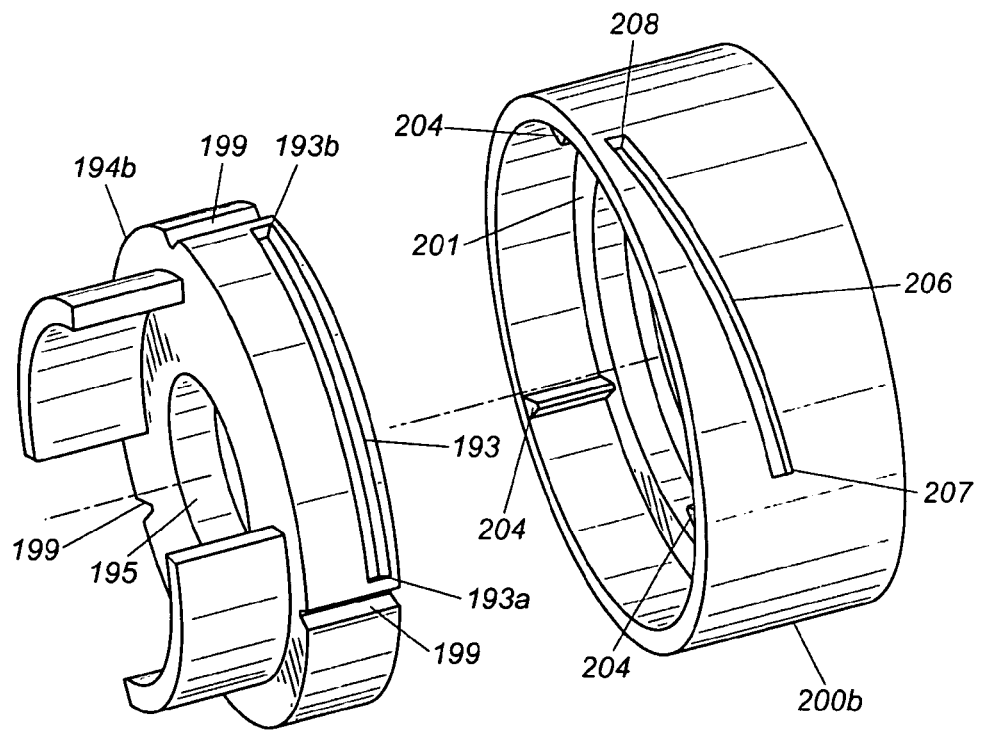
FIG. 8 is a perspective view of an alternate base plate and pressure plate for use with a chuck as shown in FIG. 4.

FIG. 8 illustrates alternate embodiments of a base plate (194b) and a pressure plate (200b) for use with the chuck shown in FIGS. 4-6. Base plate 194b includes a central aperture 195, a transverse slot 193, and one or more longitudinal grooves 199. Transverse slot 193 receives screw 192, the interaction of which limits the rotational and axial movement of outer sleeve 140 relative to base plate 194b. Transverse slot 193 lies in a plane that is transverse to longitudinal center axis 127.

Pressure plate 200b includes one or more longitudinal splines 204 and a camming slot 206. Longitudinal splines 204 are slideably received by longitudinal grooves 199 of base plate 194b, thereby non-rotationally positioning pressure plate 200b relative to base plate 194b while permitting relative axial movement between the two parts. Screw 192 extends through aperture 145 of outer sleeve 140 and camming slot 206 and into transverse slot 193 such that outer sleeve 140 can move rotationally relative to base plate 194b and pressure plate 200b. Additionally, pressure plate 200b can be moved axially relative to both base plate 194b and outer sleeve 140.

In the normal operating position, screw 192 is positioned adjacent a first end 193a of transverse slot 193 and a first end of 207 of camming slot 206 such that pressure plate 200b is disengaged from clutch plate 210. To load a tool shank (not shown) prior to operation, a user rotates outer sleeve 140 counterclockwise (when viewed from the rear of the chuck) relative to base plate 194b. Screw 192 travels along transverse slot 193 such that outer sleeve 140 rotates about base plate 194b but does not move axially relative thereto. However, as screw 192 moves along transverse slot 193, it urges pressure plate 200b forward relative to spindle 150 through the forward edge of camming slot 206. Pressure plate 200b eventually engages clutch plate 210, and subsequent forward motion of pressure plate 200b causes drive splines 213 of clutch plate of 210 to disengage rear sun gear 151b. Operation of the chuck from this point on is the same as that described above with respect to FIG. 6, and therefore and is not further provided here.

After the desired tool has been secured in the chuck, the user returns the chuck to the normal operating position by rotating outer sleeve 140 clockwise (when viewed from the rear of the chuck) relative to base plate 194b. As screw 192 travels along camming slot 206 from second end 208 to first end 207, it simultaneously exerts rearward force on the rear edge of the camming slot 206 as it moves from a second end 193b to a first end 193a of transverse slot 193. Rearward motion of pressure plate 200b eventually allows drive splines 213 of clutch plate 210 to engage rear sun gear 151b of spindle 150. The chuck is now configured for normal operations, as previously discussed with regard to the embodiment as shown in FIG. 5.

While one or more preferred embodiments of the chuck have been described above, it should be understood that any and all equivalent realizations of the chuck are included within the scope and spirit thereof. Thus, the depicted embodiments are presented by way of example only and are not intended as limitations on the chuck. It should be understood that aspects of the various one or more embodiments may be interchanged either in whole or in part. Therefore, it is contemplated that any and all such embodiments are included in the present disclosure as may fall within the literal or equivalent scope of the appended claims.

What is claimed is:

1. A chuck for use with a manual or powered driver having a housing and a rotatable drive shaft, said chuck comprising:
   a generally cylindrical body having a nose section and a tail section, said tail section having an internal cavity formed therein, said nose section having an axial bore formed therein, and said body having a first locking surface formed thereon;
   a nut disposed within said internal cavity, said nut being rotationally coupled to the drive shaft;
   a plurality of jaws movably disposed with respect to said body, each of said jaws being in communication with said axial bore and being operatively coupled to said nut so that rotation of such nut with respect to said jaws moves said jaws with respect to said body and said axial bore;
   a sleeve disposed about said body, said sleeve including a second locking surface configured to selectively engage and disengage said first locking surface; and
   wherein said body and said sleeve are axially movable with respect to each other between a first position in which said first and said second locking surfaces are engaged and a second position in which said first and said second locking surfaces are disengaged, said first position preventing the rotation of said body relative to said sleeve.

2. The chuck of claim 1, wherein when said body and said sleeve are in said second position with respect to each other, said body is rotatable relative to said sleeve.

3. The chuck of claim 2, wherein when said body and said sleeve are in said first position with respect to each other, said nut is rotatable relative to said body such that said jaws are movable relative to said body.

4. The chuck of claim 3, further comprising:
   a plurality of outer threads disposed about an outer surface of said nut;
   a plurality of inner threads disposed on each of said jaws; and
   wherein said outer threads are in driving engagement with said inner threads.

5. The chuck of claim 1, further comprising:
   a central bore extending axially through said nut;
   a spindle including a forward portion extending into said central bore and a rear portion configured to receive the drive shaft; and
   wherein when said body and said sleeve are in said first position with respect to each other, said nut is rotatable relative to said body and said spindle.

6. The chuck of claim 5, wherein when said body and said sleeve are in said second position relative to each other, said body is rotatable relative to said sleeve and said nut is non-rotatably fixed to both said spindle and said body.

7. The chuck of claim 6, further comprising a third locking surface disposed in said central bore of said nut, a fourth locking surface disposed on said forward portion of said spindle, and wherein said third and said fourth locking surfaces are configured be disengaged when said body and said sleeve are in said first position and engaged when said body and said sleeve are in said second position.

8. The chuck of claim 7, wherein said first and said second locking surfaces, and said third and said fourth locking surfaces, further comprise mating sets of locking splines, respectively.

9. The chuck of claim 5, further comprising:
   a first rack disposed about a central portion of said spindle,
   a second rack disposed about an inner surface of said body, said second rack being concentric about said first rack;
   at least one planetary gear rotatably mounted to said nut, said planetary gear engaging both said first and said second racks; and
   wherein when said body and said sleeve are in said first position relative to each other, rotation of said spindle causes said planetary gear to rotate about both a longitudinal center axis of said spindle and a longitudinal center axis of said planetary gear, resulting in rotation of said nut relative to said body.

10. The chuck of claim 9, wherein when said body is in said second position relative to said sleeve, said planetary gear is non-rotatably secured about its said longitudinal center axis.

11. The chuck of claim 9, wherein said body further comprises a front portion and a ground plate non-rotatably fixed thereto, said second rack being formed on said ground plate.

12. The chuck of claim 1, wherein said sleeve is non-rotatably fixed to the housing.

13. A chuck for use with a manual or powered driver having a housing and a rotatable drive shaft, said chuck comprising: a generally cylindrical body having a nose section and a tail section, said tail section having an internal cavity formed therein, said nose section having an axial bore formed therein; a nut disposed within said internal cavity, said nut including a central bore; a spindle including a forward portion extending into said central bore of said nut and a rear portion being configured to receive said drive shaft; a plurality of jaws movably disposed with respect to said body, each of said jaws being in communication with said axial bore and being operatively coupled to said nut; a sleeve disposed about said body; and wherein said nut is axially movable with respect to said spindle between a first position and a second position, said nut being rotatably fixed to said spindle in said first position and non-rotatably fixed to said spindle in said second position, wherein when said nut and said spindle are in said second position with respect to each other, said body is rotatable relative to said sleeve.

14. The chuck of claim 13, wherein when said nut and said spindle are in said first position with respect to each other, said nut is rotatable relative to said body such that said jaws are movable relative to said body.

15. The chuck of claim 13, further comprising:
a first rack disposed about a central portion of said spindle,
a second rack disposed about an inner surface of said body, said second rack being concentric about said first rack;
at least one planetary gear rotatably mounted to said nut, said planetary gear engaging both said first and said second racks; and
wherein when said nut and said spindle are in said first position relative to each other, rotation of said spindle causes said planetary gear to rotate about both a longitudinal center axis of said spindle and a longitudinal center axis of said planetary gear, resulting in rotation of said nut relative to said body.

16. The chuck of claim 15, wherein when said nut is in said second position relative to said spindle, said planetary gear is non-rotatably secured about its said longitudinal center axis.

17. The chuck of claim 13, further comprising a first locking surface disposed on said body and a second locking surface disposed on said sleeve, and wherein said first and said second locking surfaces are configured be engaged when said nut and said spindle are in said first position and disengaged when said nut and said spindle are in said second position, said first and said second locking surfaces being configured to non-rotatably fix said body to the housing of the driver when said first and said second locking surfaces are engaged.

18. A chuck for use with a manual or powered driver having a housing and a rotatable drive shaft, said chuck comprising:
a generally cylindrical body having a nose section and a tail section, said tail section having an internal cavity formed therein, said nose section having an axial bore formed therein, and said body having a first locking surface formed thereon;
a nut having a central bore extending axially therethrough, said nut being disposed within said internal cavity and being rotationally coupled to the drive shaft;
a spindle including a forward portion extending into said central bore and a rear portion configured to receive the drive shaft;
a plurality of jaws movably disposed with respect to said body, each of said jaws being in communication with said axial bore and being operatively coupled to said nut so that rotation of such nut with respect to said jaws moves said jaws with respect to said body and said axial bore;
a sleeve disposed about said body, said sleeve including a second locking surface configured to selectively engage and disengage said first locking surface; and
wherein said body and said sleeve are axially movable with respect to each other between a first position in which said first and said second locking surfaces are engaged and a second position in which said first and said second locking surfaces are disengaged, said first position preventing the rotation of said body relative to said sleeve, and
wherein when said body and said sleeve are in said first position with respect to each other, said nut is rotatable relative to said body and said spindle.

19. The chuck of claim 18, wherein when said body and said sleeve are in said second position relative to each other, said body is rotatable relative to said sleeve and said nut is non-rotatably fixed to both said spindle and said body.

20. The chuck of claim 18, further comprising:
a first rack disposed about a central portion of said spindle,
a second rack disposed about an inner surface of said body, said second rack being concentric about said first rack;
at least one planetary gear rotatably mounted to said nut, said planetary gear engaging both said first and said second racks; and
wherein when said body and said sleeve are in said first position relative to each other, rotation of said spindle causes said planetary gear to rotate about both a longitudinal center axis of said spindle and a longitudinal center axis of said planetary gear, resulting in rotation of said nut relative to said body.

* * * * *